United States Patent
Kobayashi et al.

(10) Patent No.: US 12,189,061 B2
(45) Date of Patent: Jan. 7, 2025

(54) OPTICAL MODULE AND DISTANCE MEASURING DEVICE

(71) Applicant: SONY SEMICONDUCTOR SOLUTIONS CORPORATION, Kanagawa (JP)

(72) Inventors: Takashi Kobayashi, Kanagawa (JP); Hirataka Ukai, Kanagawa (JP); Hiroaki Nishimori, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 829 days.

(21) Appl. No.: 17/309,271

(22) PCT Filed: Aug. 22, 2019

(86) PCT No.: PCT/JP2019/032815
§ 371 (c)(1),
(2) Date: May 13, 2021

(87) PCT Pub. No.: WO2020/105239
PCT Pub. Date: May 28, 2020

(65) Prior Publication Data
US 2022/0003847 A1    Jan. 6, 2022

(30) Foreign Application Priority Data
Nov. 22, 2018    (JP) .................. 2018-218754

(51) Int. Cl.
*G01C 3/08*    (2006.01)
*G01S 7/481*    (2006.01)
(Continued)

(52) U.S. Cl.
CPC ............ *G01S 7/4817* (2013.01); *G01S 17/10* (2013.01); *G02B 5/1866* (2013.01); *G02B 26/0833* (2013.01); *G02B 26/101* (2013.01)

(58) Field of Classification Search
CPC ..... G01S 7/4817; G01S 17/10; G02B 5/1866; G02B 26/0833; G02B 26/101
See application file for complete search history.

(56) References Cited

U.S. PATENT DOCUMENTS

2003/0234347 A1    12/2003  Akagi
2011/0255172 A1*   10/2011  Tanaka ............. H01L 21/02683
                                              257/E21.328
(Continued)

FOREIGN PATENT DOCUMENTS

CN    1444009 A    9/2003
CN    2622673 Y    6/2004
(Continued)

OTHER PUBLICATIONS

International Search Report and Written Opinion of PCT Application No. PCT/JP2019/032815, issued on Dec. 11, 2019, 09 pages of ISRWO.

*Primary Examiner* — Mark Hellner
(74) *Attorney, Agent, or Firm* — CHIP LAW GROUP (57) ABSTRACT

The present invention is aimed at radiating a linear light beam without distortion regardless of an incident angle of the scanning light beam in an optical module that irradiates a target object with a light beam and detects the reflected light. In an optical module of the present invention, an optical scanning unit (150) causes the light beam to scan in a predetermined direction (perpendicular direction). An optical conversion unit (161) converts the scanning light beam into a linear light beam in a linear direction (horizontal direction) substantially orthogonal to the scanning direction. A light detection unit (180) detects reflected light, which is (Continued)

the linear light beam reflected from a target object. The optical conversion unit (161) has an optical surface (S1) having a radius of curvature (rx) in the scanning direction that is substantially equal to a distance from a virtual scanning center point (Ox) in the scanning direction to a center point (A) of the optical surface (S1), regardless of a position in the linear direction. The optical module of the present invention is applicable to a distance measuring device.

12 Claims, 11 Drawing Sheets

(51) Int. Cl.
*G01S 17/10* (2020.01)
*G02B 5/18* (2006.01)
*G02B 26/08* (2006.01)
*G02B 26/10* (2006.01)

(56) References Cited

U.S. PATENT DOCUMENTS

2015/0301182 A1  10/2015  Geiger et al.
2019/0293948 A1* 9/2019  Ramthun ............. G01S 7/4815

FOREIGN PATENT DOCUMENTS

| | | | |
|---|---|---|---|
| CN | 1655197 A | 8/2005 | |
| CN | 1991929 A | 7/2007 | |
| CN | 104871029 A | 8/2015 | |
| DE | 10310767 A1 | 11/2003 | |
| DE | 102012025281 A1 | 6/2014 | |
| JP | H08313215 A * | 11/1996 | ........... G01S 17/894 |
| JP | 2002039716 A * | 2/2002 | ............ G01B 11/00 |
| JP | 2003-272061 A | 9/2003 | |
| JP | 2009-156810 A | 7/2009 | |
| JP | 2016-102738 A | 6/2016 | |
| WO | 2014/095105 A1 | 6/2014 | |
| WO | 2015/098130 A1 | 7/2015 | |

* cited by examiner

OPTICAL MODULE AND DISTANCE MEASURING DEVICE

CROSS REFERENCE TO RELATED APPLICATIONS

This application is a U.S. National Phase of International Patent Application No. PCT/JP2019/032815 filed on Aug. 22, 2019, which claims priority benefit of Japanese Patent Application No. JP 2018-218754 filed in the Japan Patent Office on Nov. 22, 2018. Each of the above-referenced applications is hereby incorporated herein by reference in its entirety.

TECHNICAL FIELD

The present technology relates to an optical module. More specifically, the present technology relates to an optical module that irradiates a target object with a light beam, and a distance measuring device that uses the optical module.

BACKGROUND ART

An optical module that irradiates a target object with a light beam is used for distance measurement by light spatial propagation time measurement (time of flight (ToF)), shape recognition of an object, and the like. As such an optical module, a module that causes a light beam to scan and detects light reflected from an object corresponding to each scanning position is known. For example, a device that uses slit light as scanning light has been proposed (see, for example, Patent Document 1).

CITATION LIST

Patent Document

Patent Document 1: Japanese Patent Application Laid-Open No. 2002-039716

SUMMARY OF THE INVENTION

Problems to be Solved by the Invention

In the above-described conventional technology, light output from a light emitting unit can be reduced and occurrence of noise due to ambient light can be suppressed as compared with a case where an entire area to be measured is irradiated. However, in this conventional technology, a cylindrical lens is used to generate slit light (a linear light beam), and a phenomenon arises in which, when a scanning light beam is incident, as its incident angle deviates from normal incidence, a linear light beam is distorted from a straight line to a curve. In a case where the light beam has been distorted from a straight line, it becomes difficult to detect light reflected from an object corresponding to a certain scanning position with one column of light receiving units arranged two-dimensionally. Specifically, at ends of the one column of light receiving units, reflected light deviates in position and an amount of light that can be detected decreases, and thus distance accuracy deteriorates. On the other hand, in a case where a plurality of columns is used for detection, the detection is easily influenced by noise due to ambient light. Furthermore, in a case where the linear light beam is increased in width, it is necessary to increase the light output from the light emitting units accordingly, and this increases power consumption. Moreover, it may not be possible to increase the light output due to safety regulations for eyes in some cases.

The present technology has been created in view of such a situation, and is aimed at radiating a linear light beam without distortion regardless of an incident angle of the scanning light beam in an optical module that irradiates a target object with a light beam and detects the reflected light.

Solutions to Problems

In order to solve the above-described problems, a first aspect of the present technology provides an optical module and a distance measuring device including: an optical scanning unit that causes a light beam to scan in a predetermined scanning direction; an optical conversion unit that converts, by an optical surface, the scanning light beam into a linear light beam in a linear direction substantially orthogonal to the scanning direction; and a light detection unit that detects reflected light, which is the linear light beam reflected from a target object, in which the optical surface has a radius of curvature in the scanning direction that is substantially equal to a distance from a virtual scanning center point in the scanning direction to a center point of the optical surface, regardless of a position in the linear direction. This brings about an effect of emitting a linear light beam without distortion.

Furthermore, in the first aspect, the optical conversion unit may generate the linear light beam in accordance with a radius of curvature in the linear direction. This brings about an effect of generating a linear light beam that is orthogonal to the scanning light beam.

Furthermore, in the first aspect, the optical surface may have a shape obtained by rotation on an axis parallel to a Y axis around a position the radius of curvature in the scanning direction away from a Z position on a plane with X=0 on the optical surface along a Z axis orthogonal to an X axis indicating the scanning direction and the Y axis indicating the linear direction. This brings about an effect of allowing the light beam to be incident at a right angle in a direction perpendicular to the optical surface.

Furthermore, in the first aspect, the optical surface may satisfy a conditional equation below. This brings about an effect of allowing the light beam to be incident at a right angle in a direction perpendicular to the optical surface, and emitting a linear light beam without distortion.

$$z=(y^2/ry)/(1+(1-(1+\kappa)\cdot y^2/ry^2)^{1/2})+A\cdot y^4+B\cdot y^6+C\cdot y^8+\ldots+(x^2/rx)/(1+(1-x^2/rx^2)^{1/2})$$

Where x, y, and z are coordinates on the X axis, the Y axis, and the Z axis, respectively, K is a conic constant, A, B, and C are fourth, sixth, and eighth order aspheric coefficients, respectively, rx is a radius of curvature in the scanning direction, and ry is a radius of curvature in the linear direction.

Furthermore, in the first aspect, the optical conversion unit may be any one of an optical lens, a diffraction grating having a sawtooth-shaped grating in the scanning direction, or a diffuser plate curved in the scanning direction.

Furthermore, in the first aspect, the optical scanning unit may include a MEMS mirror. This brings about an effect of miniaturizing the optical module.

Furthermore, in the first aspect, the light detection unit may include a plurality of light receiving units, and, of the plurality of light receiving units, only one that detects light reflected from an object corresponding to a scanning position of the linear light beam may be selectively operated.

This brings about an effect of inhibiting reception of unnecessary light and reducing noise associated with the unnecessary light.

Furthermore, in the first aspect, a light emitting unit that emits light and a light irradiation unit that radiates light from the light emitting unit as the light beam having a predetermined angular width may be further included. In this case, the light emitting unit may be a laser light source.

MODE FOR CARRYING OUT THE INVENTION

Modes for carrying out the present technology (hereinafter referred to as "embodiments") will be described below. The description will be made in the following order.
1. First embodiment (example of using optical lens as optical conversion unit)
2. Second embodiment (example of using diffraction grating as optical conversion unit)
3. Third embodiment (example of using diffuser plate as optical conversion unit)

1. First Embodiment

[Distance Measuring Device]

Figure 1:
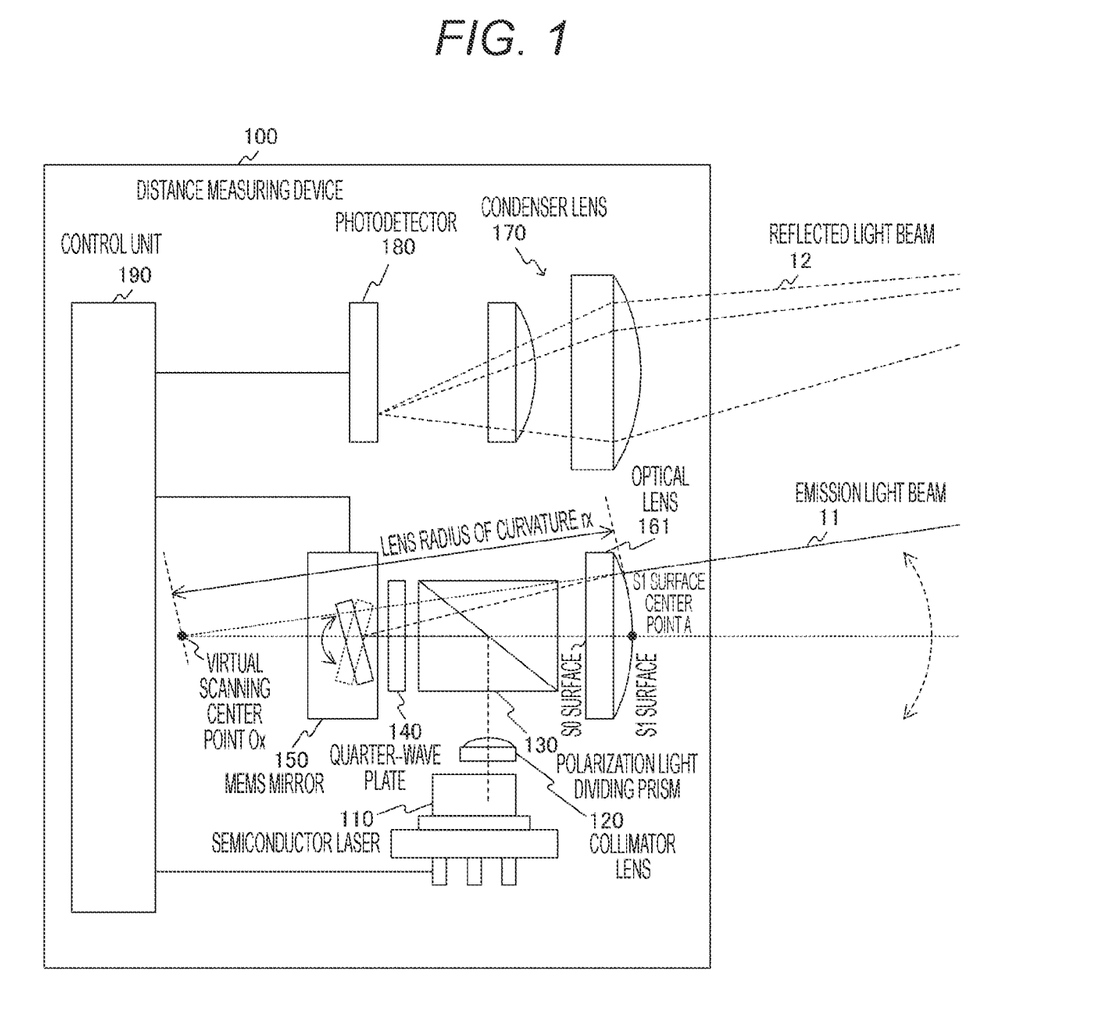
FIG. 1 illustrates a configuration example of a distance measuring device 100 according to a first embodiment of the present technology.

FIG. 1 illustrates a configuration example of a distance measuring device 100 according to a first embodiment of the present technology.

The distance measuring device 100 is an example of an optical module that irradiates a target object with a light beam and detects the reflected light, and is a device that measures time-of-flight of light to measure a distance to the target object. The distance measuring device 100 includes a semiconductor laser 110, a collimator lens 120, a polarization light dividing prism 130, a quarter-wave plate 140, a MEMS mirror 150, an optical lens 161, a condenser lens 170, a photodetector 180, and a control unit 190.

The semiconductor laser 110 is a laser light source that emits a light beam. In order to make a line-shaped light beam into a finer line, it is desirable that the semiconductor laser 110 used be of an edge-emitting type. Furthermore, it is desirable that a vertical optical confinement direction of a striped optical confinement unit provided in the semiconductor laser 110 be in a width direction (scanning direction) of the line. Note that, as the semiconductor laser 110, vertical cavity surface emitting lasers (VCSELs) arranged in a line may be used. Note that the semiconductor laser 110 is an example of a light emitting unit described in the claims.

The collimator lens 120 converts a light beam emitted from the semiconductor laser 110 into a substantially parallel light beam. The light beam that has passed through the collimator lens 120 is incident on the polarization light dividing prism 130. In a precise sense, it is desirable that the light beam that has passed through the collimator lens 120 be in a situation in which the light beam spreads as a beam having a predetermined angular width in accordance with a distance, and at the same time be applied to an entire line-shaped area in a targeted object corresponding to an area to be detected by one line-shaped light receiving unit regardless of the distance. Note that the collimator lens 120 is an example of a light irradiation unit described in the claims.

The polarization light dividing prism 130 is a polarizing beam splitter (PBS) that divides incident light into a P (parallel) polarization component and an S (senkrecht for perpendicular) polarization component. The polarization light dividing prism 130 mainly reflects and guides the light beam of the S polarization component to the MEMS mirror 150.

In a case where an edge-emitting semiconductor laser is used as the semiconductor laser 110, the light beam is linearly polarized. In a case of transverse electric wave (TE) mode emission, the laser beam is polarization light in which a polarization direction is orthogonal to the vertical optical confinement direction. Thus, almost all portions of the light beam are reflected by the polarization light dividing prism 130. In a horizontal optical confinement direction orthogonal to the vertical optical confinement direction, the stripe is generally wider than that in the vertical direction. By using this relationship, it is possible to rotate the semiconductor laser 110 about an emission direction (optical axis) to adjust the line width.

Furthermore, although not illustrated, it is also possible to detect, by a separately provided photodetector, a light beam that has passed through the polarization light dividing prism 130 and measure intensity of the light, thereby controlling power to be supplied to the semiconductor laser 110 and optimally controlling the intensity of the light beam to be emitted.

Note that an example using a prism (polarization light dividing prism 130) has been provided as an example of dividing polarization light, but, for example, a parallel plate may be used. Alternatively, setting the direction of incidence on the MEMS mirror 150 and the direction of emission from the MEMS mirror 150 to be different from each other may allow for a configuration without a light dividing prism or a light dividing plate.

The quarter-wave plate 140 is an optical function element that provides a phase difference of a quarter wave to a plane of polarization of incident light. In this example, the quarter-wave plate 140 converts a light beam reflected by the polarization light dividing prism 130 into a circularly polarized beam, and emits the circularly polarized beam to the MEMS mirror 150. Furthermore, the quarter-wave plate 140 converts a light beam reflected by the MEMS mirror 150 into a linearly polarized beam with P polarization, and emits the linearly polarized beam to the polarization light dividing prism 130. As a result, almost all portions of the light beam pass through the polarization light dividing prism 130 and are incident on the optical lens 161.

The micro electro mechanical systems (MEMS) mirror 150 is a microfabricated electromechanical mirror. The MEMS mirror 150 reflects a circularly polarized beam incident from the quarter-wave plate 140. At that time, the MEMS mirror 150 rotationally oscillates to cause the light beam to scan in a perpendicular direction. That is, the perpendicular direction is the scanning direction. The scanning light beam is incident on the quarter-wave plate 140 again, and then, as described above, almost all portions of the light beam pass through the polarization light dividing prism 130 and are incident on the optical lens 161. Note that the MEMS mirror 150 is an example of an optical scanning unit described in the claims.

The optical lens 161 emits, as an emission light beam 11, a scanning light beam caused by the MEMS mirror 150. In this optical lens 161, an optical surface (S0) on a light incident side is an optical flat surface. The optical surface (S1) on a light emitting side has different radii of curvature (rx and ry) in a perpendicular (X) direction and a horizontal (Y) direction, respectively. The curvature in the horizontal (Y) direction indicates an optical surface shape for obtaining a desired horizontal field of view (HFOV). That is, a linear light beam is formed in a horizontal linear direction. This optical surface is not limited to a spherical surface, and may have a free-form surface shape or an aspheric shape. Furthermore, the surface shape of the optical surface (S1) may function to convert an incident light beam having a Gaussian intensity distribution into a light beam having a flat-top intensity distribution in which the light intensity has been equalized.

It is desirable that the radius of curvature rx in the perpendicular (X) direction be set to be substantially equal to the distance from a virtual scanning center point Ox illustrated in the figure to the optical surface (S1) on the emitting side, regardless of the position in the horizontal direction. Note that the virtual scanning center point is a position of a point where scanning emission light beams viewed from the irradiated object side and extended in the depth direction of the distance measuring device 100 are concentrated, and is also called a virtual rotation center point. Furthermore, the virtual scanning center point is optically a virtual light emitting point.

The emission light beam 11 from the optical lens 161 is applied to a target object of distance measurement, and is reflected and scattered. Reflected light, which is the emission light beam 11 reflected from the target object, is incident on the distance measuring device 100 as a reflected light beam 12. Note that the optical lens 161 is an example of an optical conversion unit described in the claims.

The condenser lens 170 condenses the reflected light beam 12 from the target object. The reflected light beam 12 condensed by the condenser lens 170 is guided to the photodetector 180.

The photodetector 180 detects the reflected light beam 12 from the target object. As will be described later, the photodetector 180 includes a plurality of line-shaped light receiving units on a face facing the condenser lens 170, and detects light by sequentially activating the light receiving units. Note that the photodetector 180 is an example of a light detection unit described in the claims.

The control unit 190 controls a distance measuring operation in the distance measuring device 100. That is, the control unit 190 measures a light emission timing of the semiconductor laser 110, a scanning position by the MEMS mirror 150, synchronization control of light receiving unit selection in the photodetector 180, and a light detection timing. As a result, the time-of-flight required for emitted light to be reflected by a targeted object and detected as reflected light is measured, and the distance to the targeted object is measured. At that time, various methods such as a direct method in which a reflected wave is observed (direct ToF) and an indirect method based on a change in phase shift of a rectangular wave (indirect ToF) can be used. Note that the control unit 190 is an example of a measurement unit described in the claims.

Note that, in this example, the MEMS mirror 150 causes a line-shaped light beam that spreads in the horizontal direction to scan in the perpendicular direction. Alternatively, the MEMS mirror 150 may cause a line-shaped light beam that spreads in the perpendicular direction to scan in the horizontal direction.

[Optical Lens]

Figure 2A:
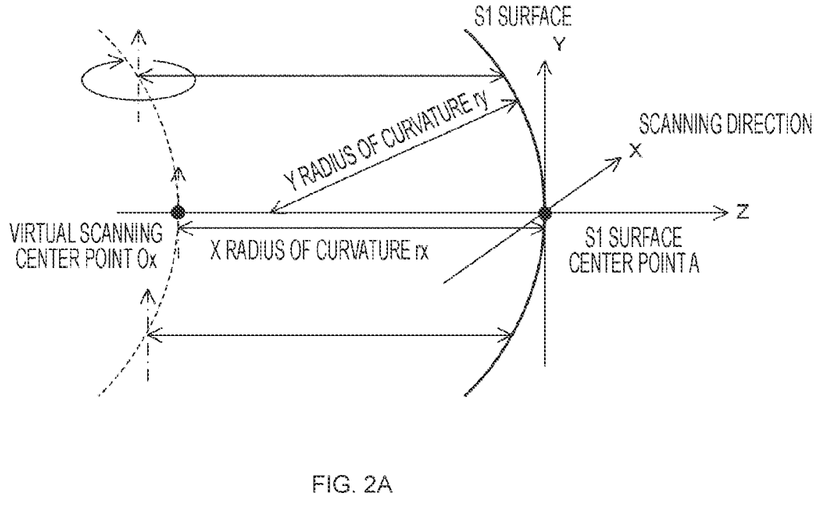
FIGS. 2A and 2B illustrate an example of a surface shape of an optical surface (S1) of an optical lens 161 according to the first embodiment of the present technology.
Figure 2B:
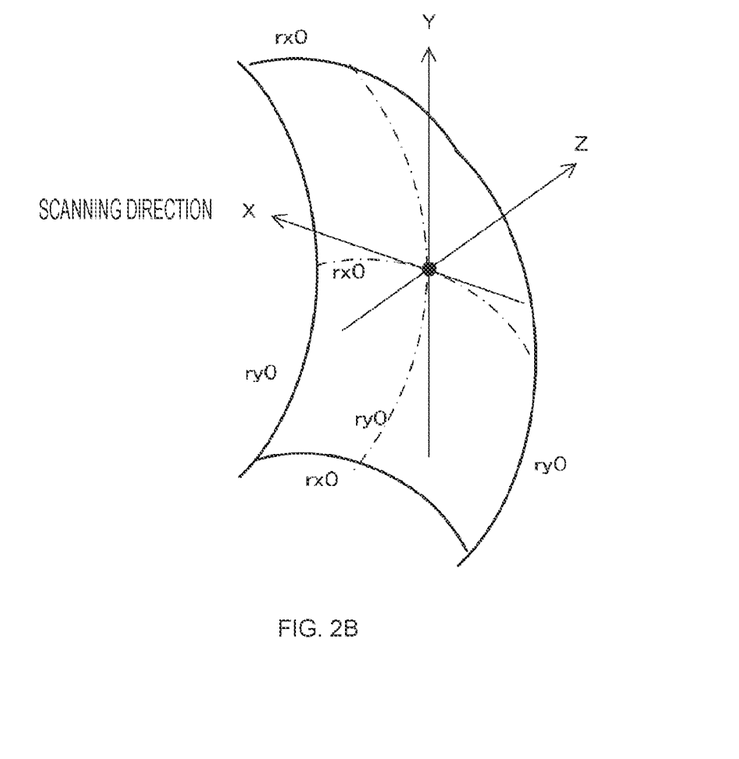

FIGS. 2A and 2B illustrate an example of the surface shape of the optical surface (S1) of the optical lens 161 according to the first embodiment of the present technology.

As illustrated in a in the figure, a curve is drawn with an optional radius of curvature ry centered on the Z axis in a YZ plane with X=0. The curve is rotated around a position that is rx away from an optional point on this curve parallel to the Z axis, in parallel to an XZ plane (that is, around an axis parallel to the Y axis), and thus a curved surface is drawn. The curved surface drawn in this way is the optical surface (S1) illustrated in b in the figure. That is, the optical surface (S1) has a shape obtained by rotating the curve on the axis parallel to the Y axis around the position the radius of curvature rx away from the virtual scanning center point Ox in the scanning direction along the Z axis orthogonal to the X axis indicating the scanning direction and the Y axis indicating the linear direction.

As illustrated in b in the figure, a curve obtained from a cross section taken along a plane parallel to the YZ plane is always the same curve created with a radius of curvature ry0. Furthermore, a curve obtained from a cross section taken along a plane parallel to the XZ plane always has a radius of curvature rx0. Note that, as described above, a curve obtained from a cross section taken along a plane parallel to the YZ plane has an optical surface shape necessary for obtaining a desired horizontal field of view (HFOV). The optical surface is not limited to a spherical surface, and may have a free-form surface shape or an aspheric shape.

This optical surface shape can be expressed by a conditional equation below.

$$z = (y^2/ry)/(1+(1-(1+\kappa)\cdot y^2/ry^2)^{1/2}) + A\cdot y^4 + B\cdot y^6 + C\cdot y^8 + \ldots + (x^2/rx)/(1+(1-x^2/rx^2)^{1/2})$$

Where x, y, and z are coordinates on the X axis, the Y axis, and the Z axis, respectively, K is a conic constant, A, B, and C are fourth, sixth, and eighth order aspheric coefficients, respectively, rx is a radius of curvature in the scanning direction, and ry is a radius of curvature in the linear direction. The first term represented by a variable y and a higher-order term thereof are terms representing a lens surface shape in a y direction for generating a line-shaped light beam, and the last term represented by a variable x is a term representing a lens shape in an x direction for creating a plane orthogonal to a scanning light beam.

Figure 3A:
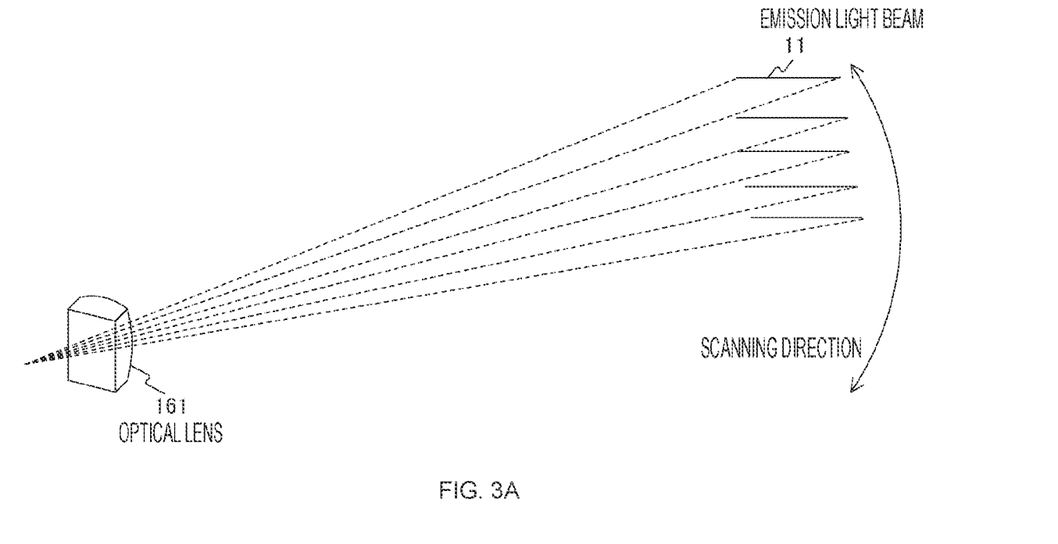
FIGS. 3A and 3B illustrate a comparative example of a shape of an emission light beam 11 formed by the optical lens 161 according to the first embodiment of the present technology.
Figure 3B:
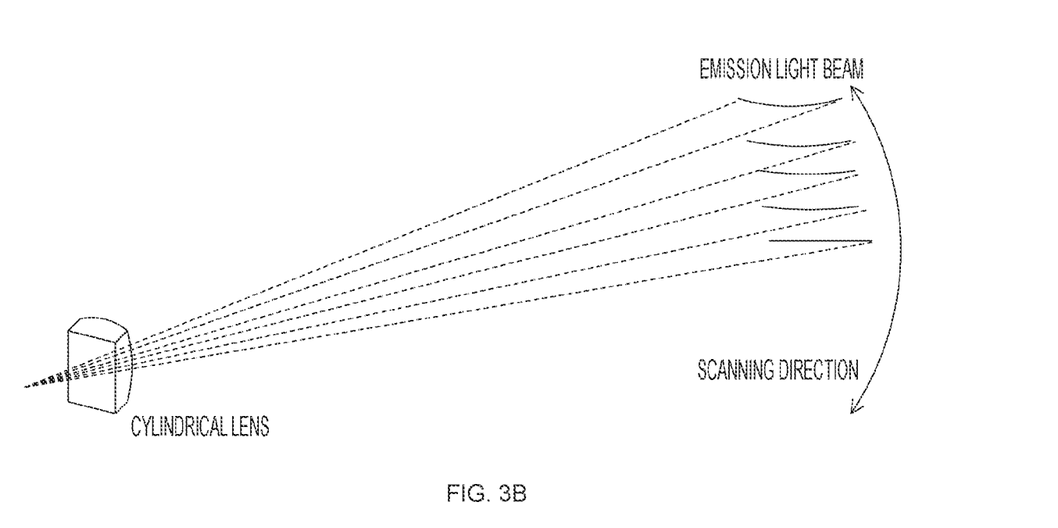

FIGS. 3A and 3B illustrate a comparative example of a shape of the emission light beam 11 formed by the optical lens 161 according to the first embodiment of the present technology.

As described above, due to the optical surface shape of the optical lens 161 and the fact that the radius of curvature rx in the perpendicular (X) direction substantially coincides with the distance from the optical surface to the virtual scanning center point Ox, a scanning light beam is always incident at a right angle in a direction perpendicular to the optical surface. As a result, as illustrated in a in the figure, the light beam is widened (or narrowed) only by the radius of curvature ry in a Y direction, and the line-shaped light beam emitted from the optical lens becomes a linear light beam without distortion regardless of its scanning position.

On the other hand, as illustrated in b in the figure, in a case where a surface shape of an XY toroidal surface of, for example, a cylindrical lens is used, it is difficult to obtain a linear light beam without distortion unlike the above-described embodiment. This toroidal surface has a radius of curvature ry in the Y direction, and is formed to be rotationally symmetric about an axis that is parallel to the Y axis and is at a position the radius of curvature rx from a position on the Z axis on the optical surface.

Note that, in the above-described embodiment, the optical surface (S0) on the light incident side of the optical lens is an optical flat surface, but this is not restrictive. For example, it is possible to form the optical surface on the light incident side in a similar manner to the optical surface (S1) on the emitting side described above so that a linear light beam without distortion may be generated by both of the optical surfaces on the incident side and the emitting side.

[MEMS Mirror]

Figure 4:
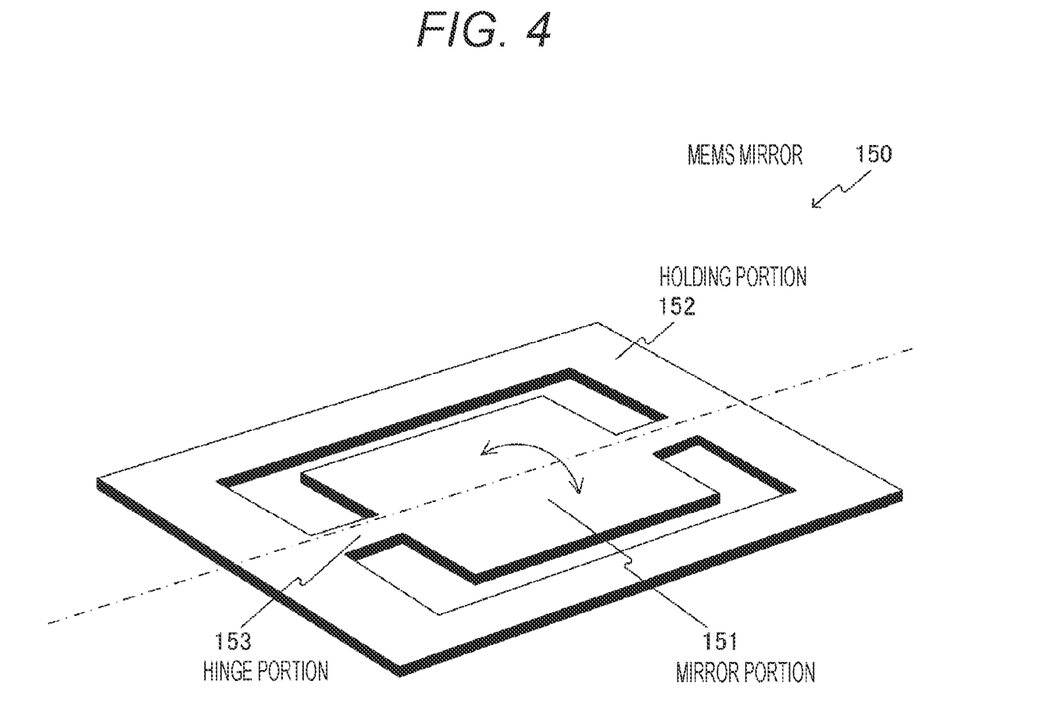
FIG. 4 illustrates an example of a structure of a MEMS mirror 150 according to the first embodiment of the present technology.

FIG. 4 illustrates an example of a structure of the MEMS mirror 150 according to the first embodiment of the present technology.

The MEMS mirror 150 includes a mirror portion 151, a holding portion 152, and hinge portions 153. The mirror portion 151 is a mirror of several-millimeter square that reflects a circularly polarized beam incident from the quarter-wave plate 140. The holding portion 152 is a member for fixing the MEMS mirror 150 to a fixation portion (not illustrated) for the MEMS mirror 150. The hinge portions 153 are members that support the mirror portion 151 and couple the mirror portion 151 to the holding portion 152.

The mirror portion 151 is coupled to the holding portion 152 by the two hinge portions 153, and rotationally oscillates about an illustrated broken line by electromagnetic force or capacitance. In the example of FIG. 1, the mirror portion 151 rotationally oscillates in the perpendicular direction to cause a light beam reflected by the mirror portion 151 to scan in the perpendicular direction.

[Photodetector]

Figure 5:
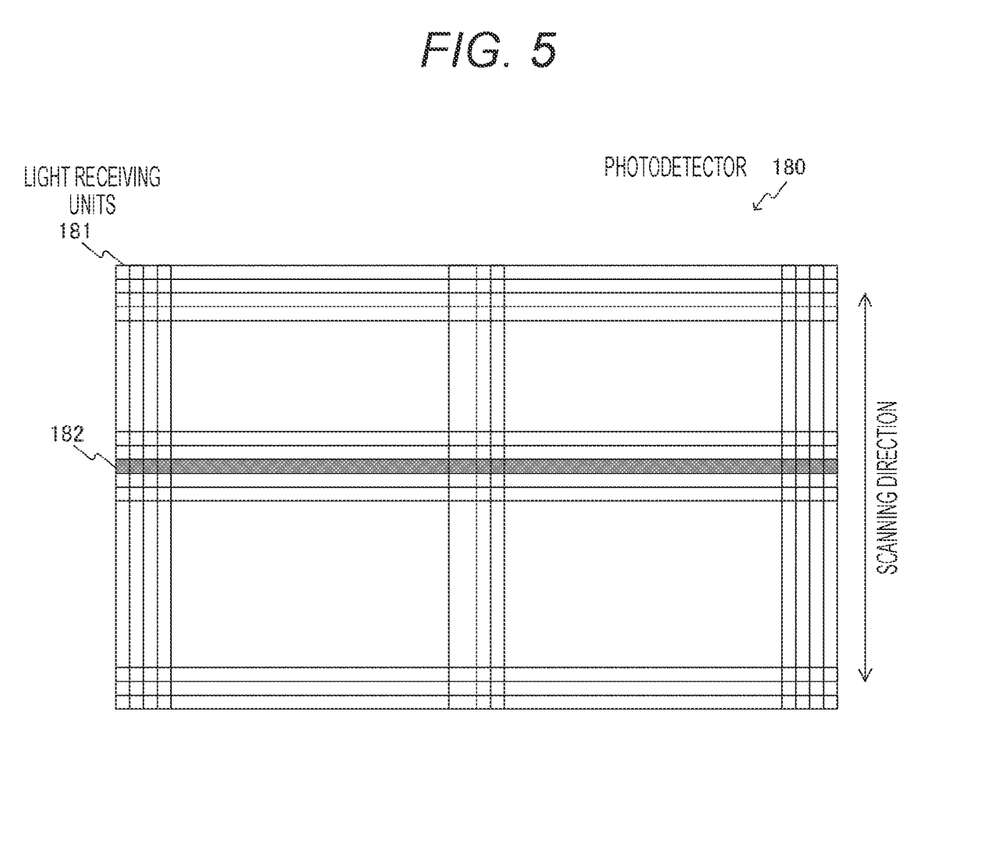
FIG. 5 illustrates an example of a structure of a photodetector 180 according to the first embodiment of the present technology.

FIG. 5 illustrates an example of a structure of the photodetector 180 according to the first embodiment of the present technology.

The photodetector 180 includes a plurality of light receiving units 181 divided in the perpendicular direction and the horizontal direction. A light beam that has scanned a certain position is reflected and scattered by a targeted object, and is guided to the line-shaped light receiving units 181 arranged horizontally. The line-shaped light beam obtained here is not distorted and is linear, and this makes it easy to selectively turn on only light receiving units 182 on a line necessary for detecting the reflected light, and turn off the light receiving units 181 on other lines. This makes it possible to reduce noise that occurs due to an influence of unnecessary light from ambient light such as sunlight.

Note that the reflected light beam 12 detected by the photodetector 180 is turned upside down with respect to the emission light beam 11. Therefore, in a case where scanning by the MEMS mirror 150 is performed from top to bottom, it is necessary to control the photodetector 180 so as to activate the light receiving units 181 from bottom to top.

As described above, according to the first embodiment of the present technology, the optical surface shape of the optical lens 161 can be used so that a line-shaped light beam orthogonal to a scanning light beam may be formed, and thus the linear emission light beam 11 without distortion can be generated.

2. Second Embodiment

[Distance Measuring Device]

Figure 6:
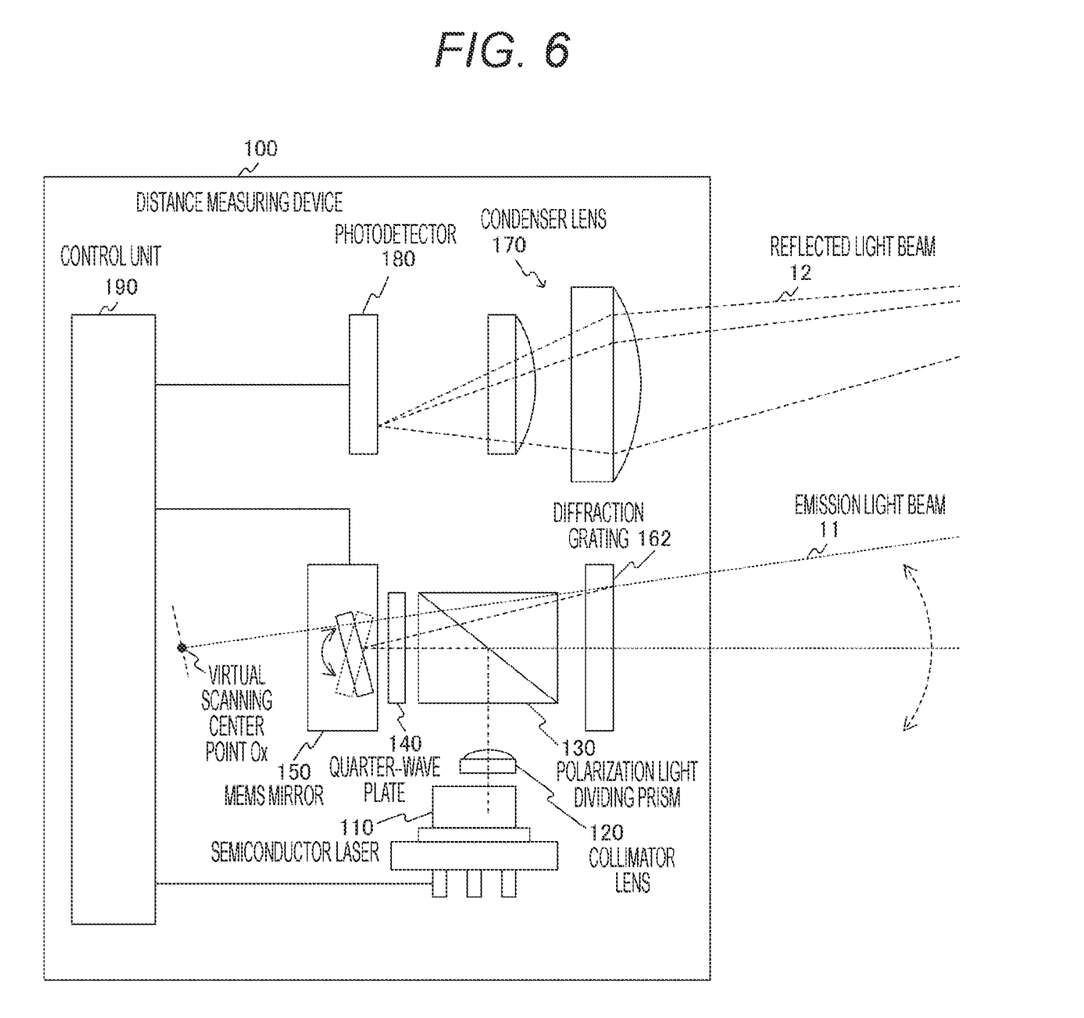
FIG. 6 illustrates a configuration example of a distance measuring device 100 according to a second embodiment of the present technology.

FIG. 6 illustrates a configuration example of a distance measuring device 100 according to a second embodiment of the present technology.

In the first embodiment described above, the optical lens 161 is used to generate a line-shaped light beam. In this second embodiment, a diffraction grating 162 is used to generate a line-shaped light beam. Therefore, the second embodiment is similar to the above-described first embodiment except that the diffraction grating 162 is provided instead of the optical lens 161 according to the first embodiment, and detailed description of other components will be omitted.

The diffraction grating 162 is an optical element having a sawtooth-shaped grating in the scanning direction. A Fresnel lens is formed in the scanning direction, and the optical surface shape conforms to the surface shape in the first embodiment described above. A material assumed to be used for the diffraction grating 162 is glass or resin. Note that the diffraction grating 162 is an example of an optical conversion unit described in the claims.

Furthermore, as the surface shape in a direction orthogonal to the scanning direction, various shapes that can be processed on the optical flat surface can be applied. Specific examples are illustrated below.

[Diffraction Grating]

Figure 7:
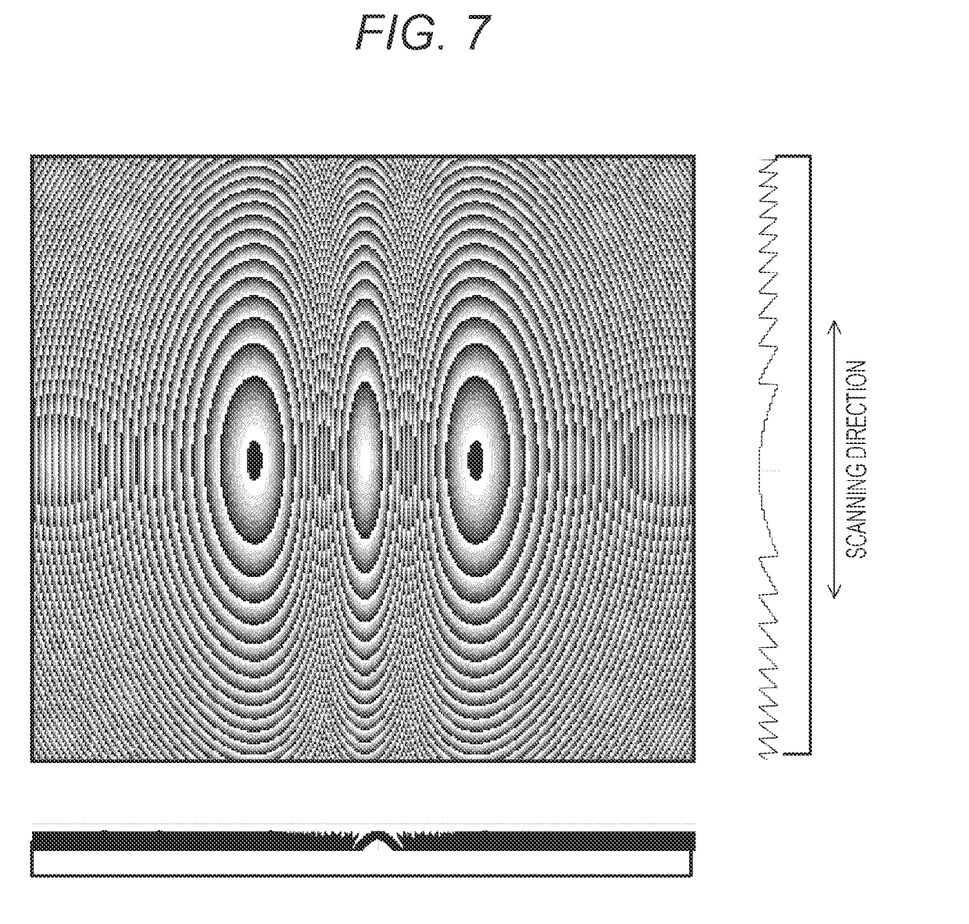
FIG. 7 illustrates a first example of a diffraction grating 162 according to the second embodiment of the present technology.

FIG. 7 illustrates a first example of the diffraction grating 162 according to the second embodiment of the present technology.

The first example of the diffraction grating 162 is a Fresnel lens having a stair-like (stepped) grating in both the scanning direction and a direction orthogonal to the scanning direction. That is, the first example is equivalent to a Fresnel lens with the optical surface in the first embodiment described above. The sawtooth shape produced may be a literally sawtooth shape formed by a cutting process, or may be a stair-like (stepped) shape formed by a semiconductor lithography process. In the figure, as an example of the sawtooth shape, an example of a stair-like (eight levels) shape is illustrated. As a result, a line-shaped light beam having a desired spread angle is generated.

Figure 8:
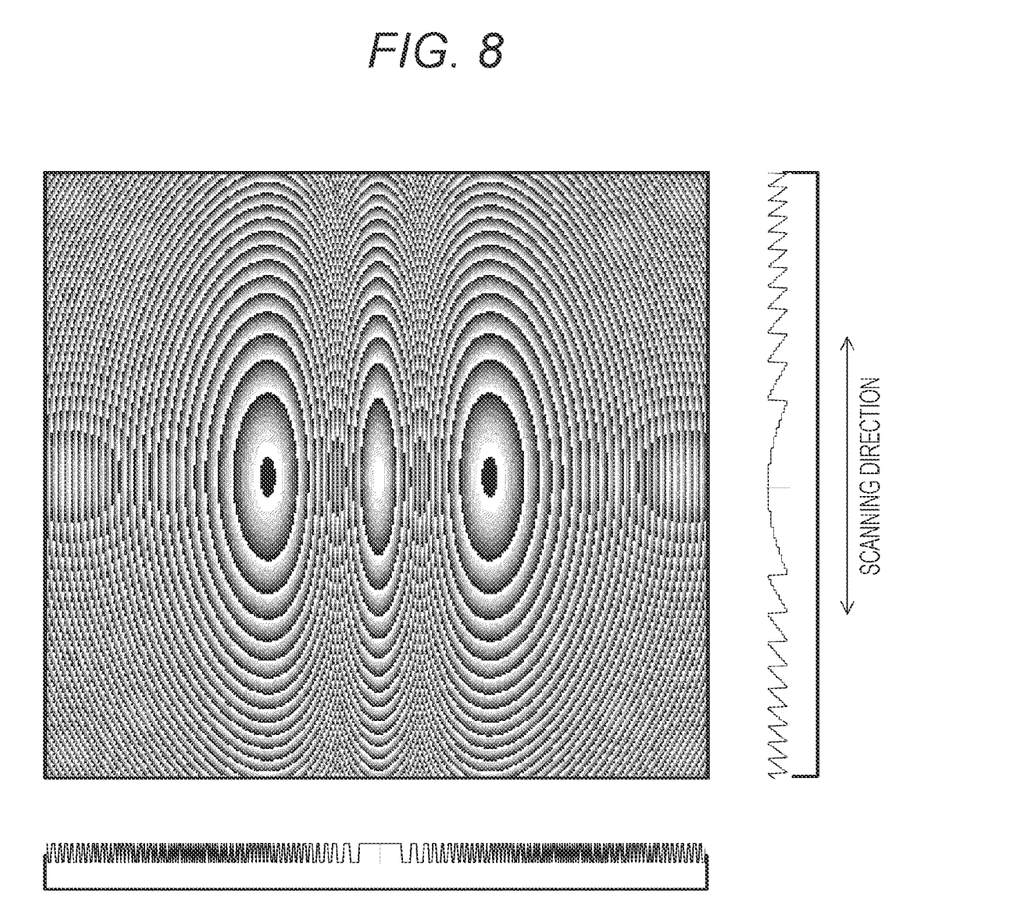
FIG. 8 illustrates a second example of the diffraction grating 162 according to the second embodiment of the present technology.

FIG. 8 illustrates a second example of the diffraction grating 162 according to the second embodiment of the present technology.

The second example of the diffraction grating 162 is a Fresnel lens having a sawtooth-shaped grating in the scanning direction and a rectangular-shaped grating in a direction orthogonal to the scanning direction. As a result, ±1 order light is used to generate a line-shaped light beam having a desired spread angle.

Figure 9:
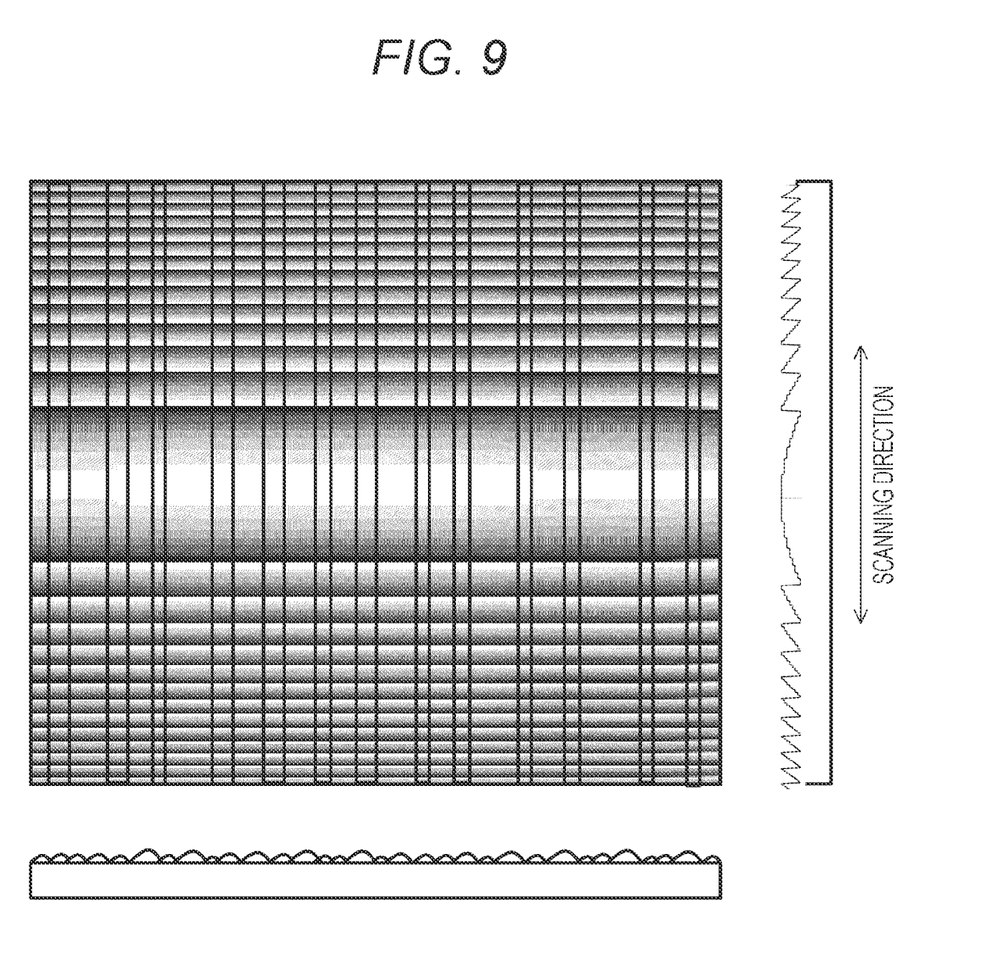
FIG. 9 illustrates a third example of the diffraction grating 162 according to the second embodiment of the present technology.

FIG. 9 illustrates a third example of the diffraction grating 162 according to the second embodiment of the present technology.

The third example of the diffraction grating 162 is a Fresnel lens having a sawtooth-shaped grating in the scanning direction, and has a linear diffuser plate in a direction orthogonal to the scanning direction, thereby generating a line-shaped light beam having a desired spread angle only in the horizontal direction.

Note that, in a case where the shapes in these first to third examples can be achieved by performing processing on a curved surface, the shapes can be applied to a lens surface shape. However, in consideration of ease of the processing and batch production by wafer level processing, it is preferable to perform the processing on the optical flat surface.

As described above, according to the second embodiment of the present technology, the diffraction grating 162 can be used so that a line-shaped light beam orthogonal to a scanning light beam may be formed, and thus a linear emission light beam 11 without distortion can be generated.

3. Third Embodiment

[Distance Measuring Device]

Figure 10:
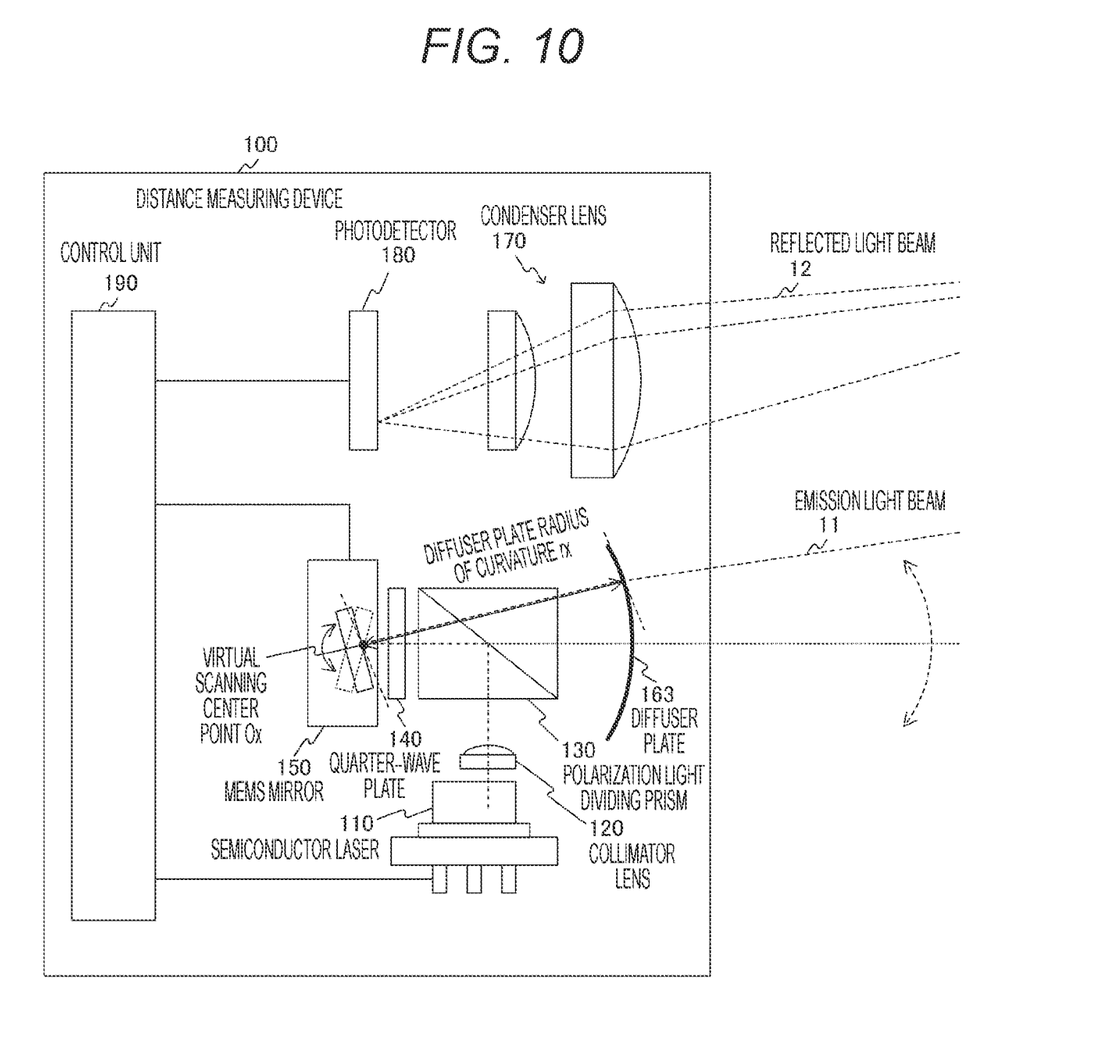
FIG. 10 illustrates a configuration example of a distance measuring device 100 according to a third embodiment of the present technology.

FIG. 10 illustrates a configuration example of a distance measuring device 100 according to a third embodiment of the present technology.

In the first embodiment described above, the optical lens 161 is used to generate a line-shaped light beam. In this third embodiment, a diffuser plate 163 is used to generate a line-shaped light beam. Therefore, the third embodiment is similar to the above-described first embodiment except that the diffuser plate 163 is provided instead of the optical lens 161 according to the first embodiment, and detailed description of other components will be omitted.

The diffuser plate 163 is curved so as to have a radius of curvature rx when viewed from a virtual scanning center point. It is desirable that the radius of curvature rx in the perpendicular (X) direction of the curved diffuser plate 163 be set to be substantially equal to the distance from the virtual scanning center point to an optical surface on the emitting side, regardless of the position in the horizontal direction. As a result, a scanning light beam is always incident at a right angle in a direction perpendicular to the optical surface, and a linear portion of the diffuser plate 163 causes the light beam to be widened only in a direction perpendicular to the scanning direction. Therefore, the line-shaped light beam emitted from the diffuser plate 163 becomes a linear light beam without distortion regardless of its scanning position. In this example, the virtual scanning center point coincides with a rotation center position of a MEMS mirror 150. Note that the diffuser plate 163 is an example of an optical conversion unit described in the claims.

Figure 11:
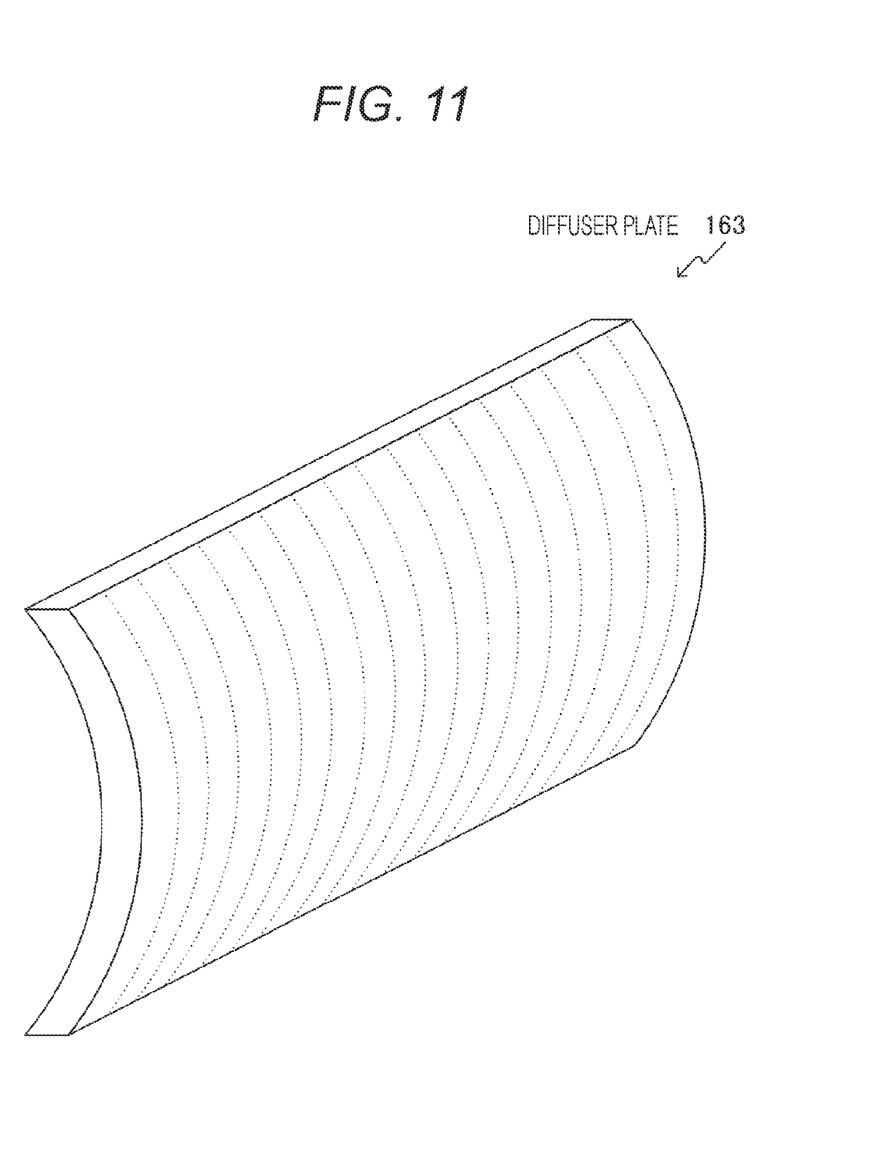
FIG. 11 illustrates an example of a shape of a diffuser plate 163 according to the third embodiment of the present technology.

FIG. 11 illustrates an example of a shape of the diffuser plate 163 according to the third embodiment of the present technology.

In this example, the diffuser plate 163 is curved in the perpendicular direction, and at the same time has a linear shape in a direction orthogonal to the perpendicular direction. Therefore, unlike the surface shape of an XY toroidal surface such as a cylindrical lens, a linear light beam can be generated without distortion.

As described above, according to the third embodiment of the present technology, the diffuser plate 163 can be used so that a line-shaped light beam orthogonal to a scanning light beam may be formed, and thus a linear emission light beam 11 without distortion can be generated.

That is, according to the embodiment of the present technology, a linear light beam without distortion is generated, and this allows the light intensity detected by the light receiving units 181 on a line for detection of light reflected from an object corresponding to the scanning position of the light beam to be maintained at a high level. Furthermore, it is possible to make a detection efficiency to be independent of the position of the light receiving units 181. Since the detection efficiency of the light receiving units 181 is enhanced, it is possible to suppress the light output from the semiconductor laser 110, which is a light emitting unit. This leads to an improvement in reliability of the semiconductor laser 110 and a reduction in power consumption as the distance measuring device 100. Furthermore, this also leads to an improvement in eye safety. It is not necessary to add, in addition to an optical element for generating a linear light beam, an optical element for correcting distortion that occurs, and the distance measuring device 100 can be miniaturized and reduced in cost. Furthermore, a trouble of optical adjustment that occurs due to addition of the optical element for distortion correction or a problem of deviation due to the environment do not occur.

Note that the above-described embodiments show examples for embodying the present technology, and the matters in the embodiments correspond to the matters specifying the invention in the claims. Similarly, the matters specifying the invention in the claims correspond to the matters in the embodiments of the present technology having the same names. However, the present technology is not limited to the embodiments, and can be embodied by making a wide variety of modifications to the embodiments without departing from the gist thereof.

Note that the effects described herein are merely illustrative and are not intended to be restrictive, and other effects may be obtained.

Note that the present technology can also be configured as described below.

(1) An optical module including:
an optical scanning unit that causes a light beam to scan in a predetermined scanning direction;
an optical conversion unit that converts, by an optical surface, the scanning light beam into a linear light beam in a linear direction substantially orthogonal to the scanning direction; and
a light detection unit that detects reflected light, which is the linear light beam reflected from a target object,
in which the optical surface has a radius of curvature in the scanning direction that is substantially equal to a distance from a virtual scanning center point in the scanning direction to a center point of the optical surface, regardless of a position in the linear direction.

(2) The optical module according to (1), in which
the optical conversion unit generates the linear light beam in accordance with a radius of curvature in the linear direction.

(3) The optical module according to (2), in which
the optical surface has a shape obtained by rotation on an axis parallel to a Y axis around a position the radius of curvature in the scanning direction away from a Z position on a plane with X=0 on the optical surface along a Z axis orthogonal to an X axis indicating the scanning direction and the Y axis indicating the linear direction.

(4) The optical module according to (3), in which the optical surface satisfies a conditional equation below:

$$z=(y^2/ry)/(1+(1-(1+\kappa)\cdot y^2/ry^2)^{1/2})+A\cdot y^4+B\cdot y^6+C\cdot y^8+\ldots+(x^2/rx)/(1+(1-x^2/rx^2)^{1/2})$$

where x, y, and z are coordinates on the X axis, the Y axis, and the Z axis, respectively, K is a conic constant, A, B, and C are fourth, sixth, and eighth order aspheric coefficients, respectively, rx is a radius of curvature in the scanning direction, and ry is a radius of curvature in the linear direction.

(5) The optical module according to any one of (1) to (4), in which
the optical conversion unit is an optical lens.

(6) The optical module according to any one of (1) to (4), in which
the optical conversion unit is a diffraction grating having a sawtooth-shaped grating in the scanning direction.

(7) The optical module according to any one of (1) to (4), in which
the optical conversion unit is a diffuser plate curved in the scanning direction.

(8) The optical module according to any one of (1) to (7), in which
the optical scanning unit includes a micro electro mechanical systems (MEMS) mirror.

(9) The optical module according to any one of (1) to (8), in which
the light detection unit includes a plurality of light receiving units, and
of the plurality of light receiving units, only one that detects light reflected from an object corresponding to a scanning position of the linear light beam is selectively operated.

(10) The optical module according to any one of (1) to (9), further including:
a light emitting unit that emits light; and
a light irradiation unit that radiates light from the light emitting unit as the light beam having a predetermined angular width.

(11) The optical module according to (10), in which
the light emitting unit is a laser light source.

(12) A distance measuring device including:
a light emitting unit that emits light;
a light irradiation unit that radiates light from the light emitting unit as a light beam having a predetermined angular width;
an optical scanning unit that causes the light beam to scan in a predetermined direction;
an optical conversion unit that converts the scanning light beam into a linear light beam in a linear direction substantially orthogonal to the scanning direction;
a light detection unit that detects reflected light, which is the linear light beam reflected from a target object; and
a measurement unit that measures time-of-flight, which is a time from when the light irradiation unit radiates light to when the light detection unit detects the reflected light, and measures a distance to the target object,
in which the optical conversion unit has an optical surface having a radius of curvature in the scanning direction that is substantially equal to a distance from a virtual scanning center point in the scanning direction to a center point of the optical surface, regardless of a position in the linear direction.

REFERENCE SIGNS LIST

11 Emission light beam
12 Reflected light beam
100 Distance measuring device
110 Semiconductor laser
120 Collimator lens
130 Polarization light dividing prism
140 Quarter-wave plate
150 MEMS mirror
151 Mirror portion
152 Holding portion
153 Hinge portion
161 Optical lens
162 Diffraction grating
163 Diffuser plate
170 Condenser lens
180 Photodetector
181 Light receiving unit
190 Control unit

The invention claimed is:

1. An optical module comprising:
an optical scanning unit that causes a light beam to scan in a predetermined scanning direction;
an optical conversion unit that converts, by an optical surface, the scanning light beam into a linear light beam in a linear direction substantially orthogonal to the scanning direction; and
a light detection unit that detects reflected light, which is the linear light beam reflected from a target object,
wherein the optical surface has a radius of curvature in the scanning direction that is substantially equal to a distance from a virtual scanning center point in the scanning direction to a center point of the optical surface, regardless of a position in the linear direction.

2. The optical module according to claim 1, wherein
the optical conversion unit generates the linear light beam in accordance with a radius of curvature in the linear direction.

3. The optical module according to claim 2, wherein
the optical surface has a shape obtained by rotation on an axis parallel to a Y axis around a position the radius of curvature in the scanning direction away from a Z position on a plane with X=0 on the optical surface along a Z axis orthogonal to an X axis indicating the scanning direction and the Y axis indicating the linear direction.

4. The optical module according to claim 3, wherein
the optical surface satisfies a conditional equation below:

$$z=(y^2/ry)/(1+(1-(1+\kappa)\cdot y^2/ry^2)^{1/2})+A\cdot y^4+B\cdot y^6+C\cdot y^8+\ldots+(x^2/rx)/(1+(1-x^2/rx^2)^{1/2})$$

where x, y, and z are coordinates on the X axis, the Y axis, and the Z axis, respectively, K is a conic constant, A, B, and C are fourth, sixth, and eighth order aspheric coefficients, respectively, rx is the radius of curvature in the scanning direction, and ry is the radius of curvature in the linear direction.

5. The optical module according to claim 1, wherein
the optical conversion unit is an optical lens.

6. The optical module according to claim 1, wherein
the optical conversion unit is a diffraction grating having a sawtooth-shaped grating in the scanning direction.

7. The optical module according to claim 1, wherein the optical conversion unit is a diffuser plate curved in the scanning direction.

8. The optical module according to claim 1, wherein the optical scanning unit includes a micro electro mechanical systems (MEMS) mirror.

9. The optical module according to claim 1, wherein the light detection unit includes a plurality of light receiving units, and
of the plurality of light receiving units, only one that detects light reflected from an object corresponding to a scanning position of the linear light beam is selectively operated.

10. The optical module according to claim 1, further comprising:
a light emitting unit that emits light; and
a light irradiation unit that radiates light from the light emitting unit as the light beam having a predetermined angular width.

11. The optical module according to claim 10, wherein the light emitting unit is a laser light source.

12. A distance measuring device comprising:
a light emitting unit that emits light;
a light irradiation unit that radiates light from the light emitting unit as a light beam having a predetermined angular width;
an optical scanning unit that causes the light beam to scan in a predetermined direction;
an optical conversion unit that converts the scanning light beam into a linear light beam in a linear direction substantially orthogonal to the scanning direction;
a light detection unit that detects reflected light, which is the linear light beam reflected from a target object; and
a measurement unit that measures time-of-flight, which is a time from when the light irradiation unit radiates light to when the light detection unit detects the reflected light, and measures a distance to the target object,
wherein the optical conversion unit has an optical surface having a radius of curvature in the scanning direction that is substantially equal to a distance from a virtual scanning center point in the scanning direction to a center point of the optical surface, regardless of a position in the linear direction.

* * * * *